(12) United States Patent
Binder

(10) Patent No.: US 6,513,052 B1
(45) Date of Patent: Jan. 28, 2003

(54) TARGETED ADVERTISING OVER GLOBAL COMPUTER NETWORKS

(75) Inventor: Erin A. Binder, Afton, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/464,346

(22) Filed: Dec. 15, 1999

(51) Int. Cl.$^7$ .............................................. G06F 17/30
(52) U.S. Cl. ...................................................... 707/204
(58) Field of Search ........................ 705/14; 707/205; 709/206, 204

(56) References Cited

U.S. PATENT DOCUMENTS

| | | | | |
|---|---|---|---|---|
| 5,740,549 A | * | 4/1998 | Reilly et al. | 705/14 |
| 5,758,067 A | * | 5/1998 | Makinen et al. | 711/162 |
| 5,796,952 A | * | 8/1998 | Davis et al. | 709/224 |
| 5,848,396 A | * | 12/1998 | Gerace | 705/1 |
| 6,014,638 A | * | 1/2000 | Burge et al. | 705/14 |
| 6,029,195 A | * | 2/2000 | Herz | 707/10 |
| 6,036,601 A | * | 3/2000 | Heckel | 463/42 |
| 6,311,194 B1 | * | 10/2001 | Sheth et al. | 707/505 |
| 6,311,232 B1 | * | 10/2001 | Cagle et al. | 710/10 |
| 6,339,761 B1 | * | 1/2002 | Cottingham | 705/14 |
| 2001/0005855 A1 | * | 6/2001 | Shaw et al. | 709/206 |
| 2001/0011226 A1 | * | 8/2001 | Greer et al. | 705/14 |

* cited by examiner

Primary Examiner—Wayne Amsbury
Assistant Examiner—Cam-Linh Nguyen
(74) Attorney, Agent, or Firm—Eric D. Levinson

(57) ABSTRACT

A method and system for presenting targeted advertising during an Internet-based connection, such as a web-based data backup session in which data is communicated from a user computer to a remote storage area for archival via the Internet. According to the invention, the user computer is communicatively coupled to the server via a computer network and an asset profile for the computer is generated. The asset profile identifies the software applications that are currently loaded on the computer and the current hardware configuration for the computer including a processor type and connected hardware devices. In addition, the asset profile contains usage information such as a frequency of use for the various software applications. As a function of the uploaded asset profile, advertisements are selected from an advertisement database and are communicated to the computer for display to the user. Because of the detailed asset information, targeted advertising information having a high correlation to the user's computing behavior can be selected and displayed.

39 Claims, 3 Drawing Sheets

TARGETED ADVERTISING OVER GLOBAL COMPUTER NETWORKS

TECHNICAL FIELD

This invention relates generally to selecting and presenting targeted advertising information to a user based on an asset profile of the user's computer.

BACKGROUND INFORMATION

The Internet is a worldwide collection of networks that spans over 100 countries and connect millions of computers. Reports indicate that the Internet is growing faster than all preceding information technologies including radio and television. The World Wide Web ("the web") is one of the fastest growing facets of the Internet and represents the computers that support the hypertext transfer protocol (HTTP), which is a common protocol for exchanging information.

Advertising on the web is growing rapidly. Estimates indicate that $1.5 billion was spent on Internet advertising worldwide in 1998 and that this amount will increase to $15.1 billion in 2003. On the web, as in traditional media, there are two widely recognized types of advertising-brand advertising and response-oriented advertising. Brand advertising is intended to generate awareness of and create a specific image for a particular company, product or service. In contrast, response-oriented advertising, or direct marketing, is intended to generate a specific response or action from the consumer after exposure to an advertisement. Response-oriented advertisers focus on the short-term benefit of advertising and seek to maximize the number of user responses per advertising dollar.

The web is particularly well suited for response-oriented advertising. Estimates indicate that spending on direct marketing on the Internet will reach $5.5 billion or approximately 65% of total Internet advertising spending in 2002. The web makes it easier for consumers to read and respond to an advertisement than traditional direct response media such as toll-free numbers or business reply cards. Also, measuring response rates, an essential element for response-oriented advertisers, is easier on the web than in traditional media.

In order to improve the effectiveness of advertising on the Internet, and for other reasons stated below which will become apparent to those skilled in the art upon reading and understanding the present specification, there is a need in the art for an improved system that is able to select and present targeted advertising information to a user via the Internet. There is a need for such a system that is able to select and present advertisement that has a high correlation to the user's needs, behavior, and preferences, thereby increasing the probability of generating revenue from the advertising.

SUMMARY OF THE INVENTION

As explained in detail below, the invention addresses the above-described issues and is directed to presenting targeted advertising information to a user as a function of an "asset profile" of the user's computer. The asset profile is a set of information that identifies the software applications that are currently loaded on the computer and the current hardware configuration for the computer including a processor type and connected hardware devices. In addition, the asset profile contains usage information such as a frequency of use for the various software applications.

According to one aspect of the invention, targeted advertising is presented to a user during a web-based data archival process in which data is archived from the user's computer to a remote storage area via the Internet. A web-based communication session is initiated between the user's computer and a remote storage server and data stored on the user's computer is transferred to the storage server and archived for future restoration of the user's computer. In addition to backing-up data stored on the user's computer, an asset profile of the user's computer is generated and stored on the storage server. In one embodiment, the asset profile is generated via software executing on the user's computer. In another embodiment, however, a portion of the asset profile, such as the usage information, is generated by the storage server.

According to the invention, advertisements are selected from an advertisement database based on the asset profile and are communicated to the computer for display to the user. Because of the detailed asset information obtained during the web-based data archival procedure, very targeted advertising information having a high correlation to the user's behavior can be selected and presented to the user, thereby increasing the probability of generating revenue from the advertisement.

DETAILED DESCRIPTION

In the following detailed description, references are made to the accompanying drawings that illustrate specific embodiments in which the invention may be practiced. Electrical, mechanical, programmatic and structural changes may be made to the embodiments without departing from the spirit and scope of the present invention. The following detailed description is, therefore, not to be taken in a limiting sense and the scope of the present invention is defined by the claims.

System Level Overview

Figure 1:
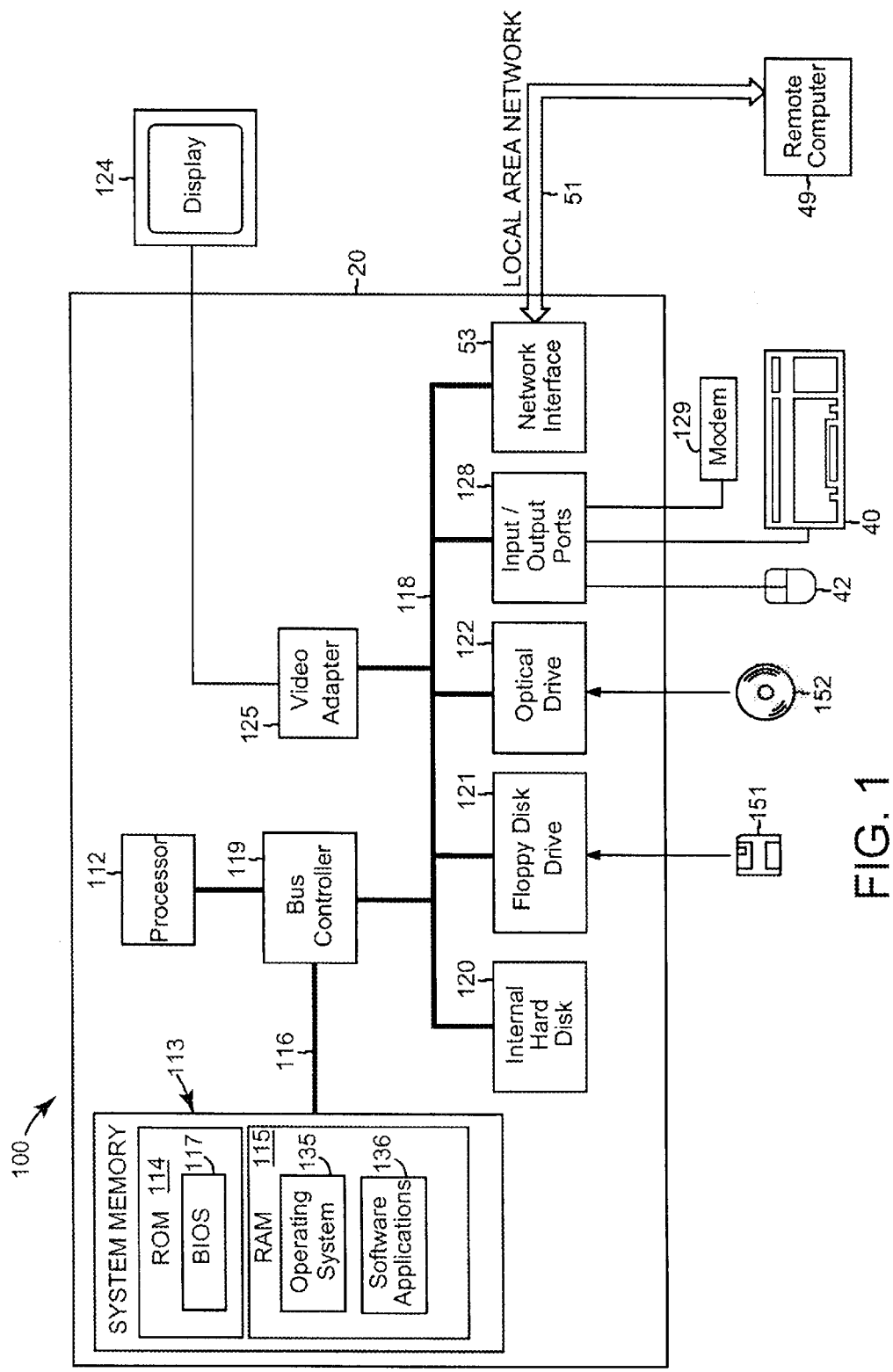
FIG. 1 is a diagram showing a hardware and operating environment of a suitable computer in conjunction with which embodiments of the invention may be practiced.

FIG. 1 illustrates a computer 100 suitable for supporting the operation of an embodiment of the present invention. As shown in FIG. 1, the computer 100 includes a processor 112 that in one embodiment belongs to the PENTIUM® family of microprocessors manufactured by the Intel Corporation of Santa Clara, California. However, it should be understood that the invention can be implemented on computers based upon other microprocessors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. Computer 100 represents any server, personal computer, laptop or even a battery-powered, pocket-sized, mobile computer known as a hand-held PC.

Computer 100 includes system memory 113 (including read only memory (ROM) 114 and random access memory (RAM) 115), which is connected to the processor 112 by a system data/address bus 116. ROM 114 represents any device that is primarily read-only including electrically erasable programmable read-only memory (EEPROM), flash memory, etc. RAM 115 represents any random access memory such as Synchronous Dynamic Random Access Memory.

Within the computer 100, input/output bus 118 is connected to the data/address bus 116 via bus controller 119. In one embodiment, input/output bus 118 is implemented as a standard Peripheral Component Interconnect (PCI) bus. The bus controller 119 examines all signals from the processor 112 to route the signals to the appropriate bus. Signals between the processor 112 and the system memory 113 are merely passed through the bus controller 119. However, signals from the processor 112 intended for devices other than system memory 113 are routed onto the input/output bus 118.

Various devices are connected to the input/output bus 118 including hard disk drive 120, floppy drive 121 that is used to read floppy disk 151, and optical drive 122, such as a CD-ROM drive that is used to read an optical disk 152. The video display 124 or other kind of display device is connected to the input/output bus 118 via a video adapter 125.

A user enters commands and information into the computer 100 by using a keyboard 40 and/or pointing device, such as a mouse 42, which are connected to bus 118 via input/output ports 128. Other types of pointing devices (not shown in FIG. 1) include track pads, track balls, joy sticks, data gloves, head trackers, and other devices suitable for positioning a cursor on the video display 124.

As shown in FIG. 1, the computer 100 also includes a modem 129. Although illustrated in FIG. 1 as external to the computer 100, those of ordinary skill in the art will quickly recognize that the modem 129 may also be internal to the computer 100. The modem 129 is typically used to communicate over wide area networks (not shown), such as the global Internet.

Software applications 136 and data are typically stored via one of the memory storage devices, which may include the hard disk 120, floppy disk 151, CD-ROM 152 and are copied to RAM 115 for execution. In one embodiment, however, software applications 136 are stored in ROM 114 and are copied to RAM 115 for execution or are executed directly from ROM 114.

In general, the operating system 135 executes software applications 136 and carries out instructions issued by the user. For example, when the user wants to load a software application 136, the operating system 135 interprets the instruction and causes the processor 112 to load software application 136 into RAM 115 from either the hard disk 120 or the optical disk 152. Once software application 136 is loaded into the RAM 115, it can be used by the processor 112. In case of large software applications 136, processor 112 loads various portions of program modules into RAM 115 as needed.

The Basic Input/Output System (BIOS) 117 for the computer 100 is stored in ROM 114 and is loaded into RAM 115 upon booting. Those skilled in the art will recognize that the BIOS 117 is a set of basic executable routines that have conventionally helped to transfer information between the computing resources within the computer 100. Operating system 135 or other software applications 136 use these low-level service routines.

In one embodiment computer 100 includes a registry (not shown) which is a system database that holds configuration information for computer 100. For example, Windows® 95 and Windows® NT by Microsoft maintain the registry in two hidden files, called USER.DAT and SYSTEM.DAT, located on a permanent storage device such as an internal disk.

Figure 2:
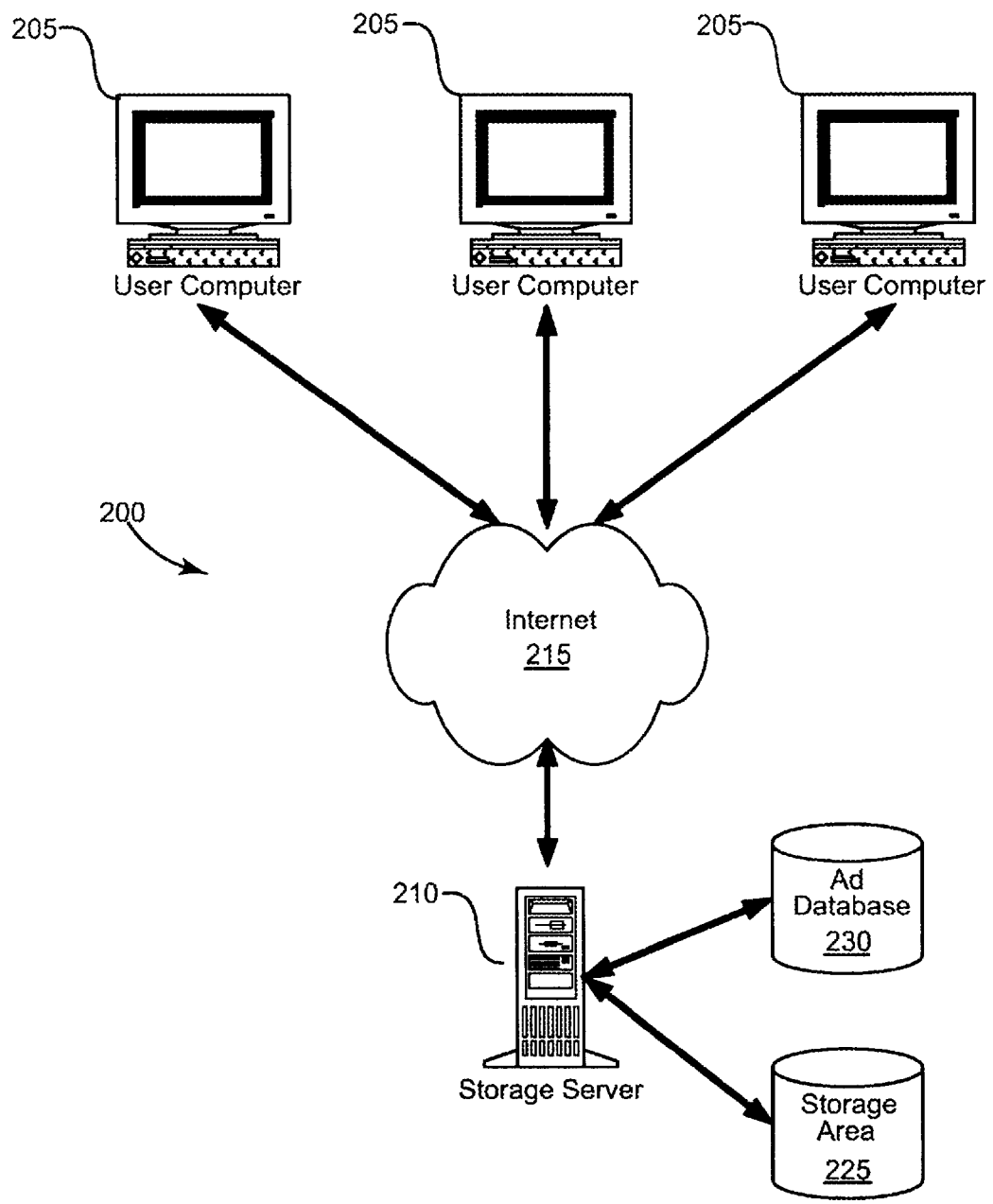
FIG. 2 further illustrates one embodiment of a computing system in which a storage server archives data from one or more user computers and presents targeted advertisements to the user computers based on their asset profile.

FIG. 2 is a block diagram illustrating one embodiment of a computing environment 200 in which targeted advertising is presented to a user as a function of an asset profile of the user's computer. In this embodiment storage server 210 provides targeted advertising to user computers 205 during an Internet backup procedure that archives data from user computer 205 to remote storage area 225. Storage server 210 and user computers 205 represent computing devices such as computer 100 described in FIG. 1. During the Internet backup, data and asset information is communicated from user computers 205 to storage server 225 such that in the event that user computer 205 was corrupted for any reason, a user could easily restore user computer 205 to its prior state. In addition, administrators of storage server 210 can coordinate with computer manufactures to create and ship the user an identically configured computer in the event user computer 225 in not salvageable.

The asset information, referred to hereafter as an asset profile, describes in detail the current state of user computer 205. The asset profile identifies the operating system 135 and software applications 136 that are currently loaded on user computer 205 that is being archived as well as its hardware configuration such as processor 112 and connected hardware devices 120 through 129. In addition, the asset profile contains usage information such as a frequency of use for the various software applications 136. In one embodiment the asset profile is generated via software executing on the user's computer 205 at the time of the web-based backup. In another embodiment, however, portions of the asset profile, such as the usage information, is generated by the storage server 210 by analyzing the types of files archived and the number of versions stored for each file.

According to the invention, storage server 210 analyzes the asset profile generated during the Internet backup session and selects advertising information from advertising database 230 as a function of the asset profile. Because of the detailed information received during the Internet backup, storage server 205 is able to select very targeted advertising information. User computer 205 displays the selected advertising material to the user.

The invention, however, is not limited to Internet backup but can be applied in any application where user computers 205 connect to server 210, either directly or via a network such as Internet 215, and uploads asset information. For example, a user may agree to have asset information uploaded to an Internet Service Provider (ISP) each time an Internet session is established in order to obtain free Internet access. In exchange for providing free Internet access, the ISP is able to present the user with very targeted advertisements during the Internet session.

Methods of an Exemplary Embodiment of the Invention

In the previous section, a system level overview of various embodiments of the invention was described. In this section, the particular methods performed by the exemplary embodiments are described by reference to a flowchart. The methods to be performed by the embodiments constitute computer programs made up of computer-executable instructions.

Figure 3:
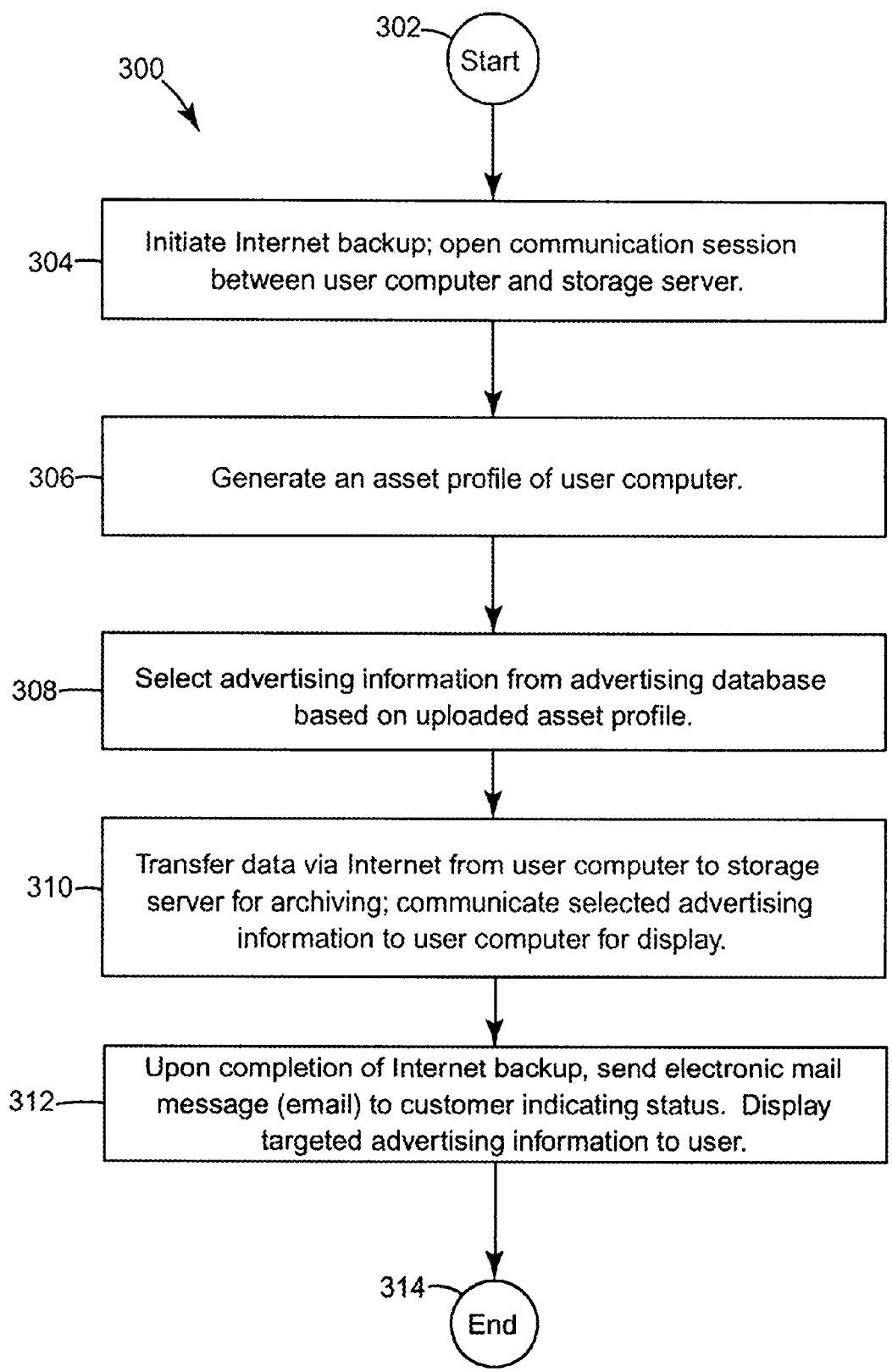
FIG. 3 is a flow chart illustrating one mode of operation of a computing system incorporating the inventive system for presenting targeted advertising information described herein.

FIG. 3 is a flow chart illustrating method 300 for presenting targeted advertising information to a user via one of the user computers 205 within computing environment 200. Method 300 is described within the context of an Internet backup session. As described above, however, the invention is not so limited and can be applied during any Internet connection.

Method 300 begins in block 302 and proceeds to block 304 where software application 136 (FIG. 1) executing on one of the user computers 205 initiates an Internet backup session. The session may be triggered manually via the user or can be automatically started by a scheduling mechanism. Upon initiation, user computer 205 opens a communication session with storage server 205 for archiving data over Internet 215. This communication session can take several forms and can use a variety of protocols. Typically, the communication session uses TCP/IP as a base protocol and can use the HTTP protocol, the FTP protocol or even a proprietary backup protocol. In addition, the user can initiate the session via a conventional web browser or via a dedicated backup software application executing upon user computer 205.

Once the communication session is open, in block 306 an asset profile for the user computer 205 is generated and stored on storage server 210. The asset profile includes detailed information regarding the current state of the user computer 205 such as the following:

1) basic hardware configuration including number, type and speed of processors 112, capacity of RAM 115, connected devices 120 through 124 and any installed device drivers;
2) an inventory of all software applications 136 and operating system 135 installed on user computer 205;
3) frequency of use, such as N times per month, for each installed software application 136;
4) the version number for each installed software application 136;
5) an inventory of all hardware devices, internal and external, connected to user computer 205; and
6) an inventory of all data files stored on computer 205 including file type.

In one embodiment, much of the asset profile is generated at the user computer 205 at the time of backup. For example, software application 136 executing on user computer 205 surveys user computer 205 and uploads the information to storage server 210. In another embodiment, storage server 210 generates portions of the asset profile based on information received from user computer 205 during backup. For example, storage server 210 can generate much of the asset profile by analyzing the types of data files that are archived in step 310 below and the frequency at which the data files are archived. The frequency of archival has a direct correlation to the frequency that the user modifies the data files. In addition, information can be gathered when the communication session was opened. For example, in a standard HTTP session, storage server 210 is able to determine configuration information of user computer 205 including: the Internet Protocol (IP) address, the type web browser, and the Internet domain to which user computer 205 belongs.

In block 308 storage server 210 analyzes the generated asset profile and selects advertising information from advertising database 230 as a function of the asset profile. In one embodiment, storage server 210 selects advertisements based on the types and versions of software applications 136 loaded on user computer 205. If storage server 210 determines that Microsoft® Word Version 6.0 is installed on computer 100 and that this version is several versions out of date, storage server 210 can select an advertisement from advertisement database 230 that offers an upgrade to Microsoft Word. Similarly, if storage server 210 determines that Intuit's® TurboTax® is installed on user computer 205 and that user computer 205 is located in Minnesota, then storage server 210 may select an advertisement from advertisement database 230 that promotes an upgrade to new Minnesota state tax laws. As another example, storage server 210 can select advertisements based on the type of operating system loaded on user computer 205.

In another embodiment, storage server 210 selects advertisements based on the hardware configuration identified by the asset profile. For example, storage server 210 may select advertisements from advertisement database 230 based on whether user computer 205 is an IBM® compatible computer or a Macintosh® compatible computer. As another example, storage server 210 can select an advertisement for a new hard disk if the asset profile indicates that hard disk 120 of user computer 205 is running low on available storage space.

In another embodiment, storage server 210 selects advertisements based on the user access patterns (frequencies) for software applications 136 and data files stored on hard disk 120 as identified by the asset profile. For example, storage server 210 can select advertisements based on activity of user computer 205 such as how often during the day user computer 205 is in use, which files are accessed most frequently, the time of day at which user computer 205 is most active, etc.

In block 310, user computer 205 and storage server 210 coordinate the transfer of data using conventional web-based backup techniques in order to backup user computer 205 to storage area 255 via Internet 215. During this process storage server 210 communicates the selected advertising information to user computer 205 for display to the user via software application 136. In one embodiment, storage server 210 continuously updates the asset profile based on the data received from user computer 205 during backup and selects corresponding targeted advertising based upon the updated asset profile.

Upon completion of the Internet backup process, in block 312 storage server 210 notifies the user such by sending an electronic mail message (email) to the user when the Internet backup process is completed. Typically, the email includes an overall status, such as whether the process was successful, and various statistics including the number of files, total bytes transferred, etc. In one embodiment storage server includes the selected targeted information in the status email. In addition, direct mail including the advertising may be sent to the user. After sending the email, the process terminates in block 314.

Various embodiments have been described of a method and system for presenting targeted advertising during an Internet-based connection such as during a data backup process in which data is archived from a computer to a remote storage area via the Internet. In order to backup the computer's data, an asset profile of the computer is generated. The asset profile can include a wide range of information that identifies the current state of the user's computer such as the software applications that are loaded on the user computer, versions for the loaded software applications, the hardware devices attached to the computer, access frequencies for data files stored on the computer, installed device drivers and basic hardware information such as a number, type and speed of processors, capacity of internal RAM, and connected devices. Because of the detailed asset information very targeted advertising information having a high correlation to the user's computing behavior can be selected. This application is intended to cover any adaptation or variation of the present invention. It is intended that this invention be limited only by the claims and equivalents thereof.

I claim:

1. A method for displaying advertising information on a computer comprising:

initiating a network backup session to archive data from a computer to a storage server;

generating an asset profile based on the archived data for restoration of the computer;

selecting one or more advertisements from an advertisement database as a function of the asset profile; and communicating the advertisements to the computer for display to a user.

2. The method of claim 1, wherein generating the asset profile includes determining a set of software applications that are loaded on the user computer.

3. The method of claim 1, wherein generating the asset profile includes determining a set of hardware devices attached to the computer.

4. The method of claim 1, wherein generating the asset profile includes determining access rates for files stored on the computer.

5. The method of claim 1, wherein generating the asset profile includes determining versions for files stored on the computer.

6. The method of claim 1, wherein communicating the advertisement includes sending the advertisements via the HTTP protocol such that the user computer displays the advertisement via a web browser.

7. The method of claim 1, wherein communicating the advertisement includes sending the user an electronic mail message (email) that includes the advertisements.

8. The method of claim 1, wherein generating the asset profile includes generating the asset profile via software executing on the computer.

9. The method of claim 1, wherein generating the asset profile includes generating the asset profile via software executing on the server.

10. A method for archiving data from a computer coupled to the Internet comprising:

initiating an Internet backup session to archive data from a computer to a storage server;

selecting one or more advertisements from an advertisement database based on the archived data; and displaying the selected advertisements on the computer.

11. The method of claim 10, wherein displaying the selected advertisement includes displaying the advertisement on the computer via a web browser.

12. The method of claim 10, further comprising sending an electronic mail message (email) upon completion of the Internet backup session, wherein the email includes the selected advertising.

13. The method of claim 10, further comprising generating an asset profile based on the archived data for restoration of the computer.

14. The method of claim 10, wherein generating the asset profile includes generating the asset profile to identify:

a set of software applications that are loaded on the computer;

a set of hardware devices attached to the computer;

a set of data files stored on the computer; and access rates for data files.

15. A system comprising:

a user computer;

a storage server to archive data from the user computer; and an advertisement database coupled to the storage server, wherein advertisement data within the advertisement database is selectable as a function of asset information for restoring the archived data to the user computer.

16. The system of claim 15 and further including an Internet backup module executing on the user computer and generating the asset information for the user computer.

17. The system of claim 15, wherein the asset information identifies a set of software applications that is loaded on the user computer.

18. The system of claim 17, wherein the asset information identifies usage frequencies for the set of software applications.

19. The system of claim 17, wherein the asset information identifies versions for the set of software applications.

20. The method of claim 15, wherein the asset information identifies a set of hardware devices attached to the computer.

21. The system of claim 15, wherein the server further includes means for sending the advertisements to the user computer for display within a web browser.

22. The system of claim 15, wherein the server further includes means for sending the user an electronic mail message (email) that includes the advertisements.

23. An online computer system providing backup services to remote user computers comprising:

a storage server having a remote storage area to store user backup information, wherein the storage server is communicatively coupled to the remote user computers via the Internet;

an Internet backup software application executing on the storage server to receive backup requests from remote user computers; and an advertisement database coupled to the server, wherein advertisement data within the advertisement database is selectable as a function of asset information describing the user computers, wherein the Internet backup software application generates asset information based on archived data received from the user computers, selects advertisement data from the advertisement database as a function of the asset information, and communicates the selected advertisement data to the remote user computers.

24. The system of claim 23, wherein the asset information identifies a set of software applications that is loaded on the user computer.

25. The system of claim 24, wherein the asset information identifies usage frequencies for the set of software applications.

26. The system of claim 24, wherein the asset information identifies versions for the set of software applications.

27. The system of claim 23, wherein the asset information identifies a set of hardware devices attached to the computer.

28. A computer-readable medium having computer-executable instructions for performing the steps comprising:

initiating a network backup session to archive data from a user computer to a storage server via a computer network;

generating an asset profile based on the archived data for restoration of the computer;

selecting one or more advertisements based on the asset profile; and communicating the advertisements to the computer for display to a user.

29. The computer-readable medium of claim 28, wherein generating the asset profile includes determining a set of software applications that are loaded on the user computer.

30. The computer-readable medium of claim 28, wherein generating the asset profile includes determining a set of hardware devices attached to the computer;

31. The computer-readable medium of claim 28, wherein generating the asset profile includes determining access rates for files stored on the computer.

32. The computer-readable medium of claim 28, wherein generating the asset profile includes determining versions for files stored on the computer;

33. The computer-readable medium of claim 28, wherein communicating the advertisement includes sending the advertisements via the HTTP protocol such that the user computer displays the advertisement via a web browser.

34. The computer-readable medium of claim 28, wherein communicating the advertisement includes sending the user an electronic mail message (email) that includes the advertisements.

35. A computer-readable medium having stored thereon a data structure comprising:

a first data field containing advertising information; and a second data field containing asset information describing data archived from a computer, wherein the asset information of the second data field is used as an index for selecting advertising of the first data field.

36. The computer-readable medium of claim 35, wherein the asset information of the second data field identifies a software application.

37. The computer-readable medium of claim 35, wherein the asset information of the second data field identifies a hardware device.

38. The computer-readable medium of claim 35, wherein the asset information of the second data field identifies an access rate for a data file stored on the computer.

39. The computer-readable medium of claim 35, wherein the asset information of the second data field identifies a version of a software application stored on the computer.

* * * * *